United States Patent [19]

Schmitt et al.

[11] Patent Number: 5,743,538
[45] Date of Patent: Apr. 28, 1998

[54] CHUCK ASSEMBLY HAVING A PULL UP FEATURE

[75] Inventors: Peter J. Schmitt, Ontario; Eugene A. Swain, Webster; Kamran U. Zaman, Pittsford; Alan D. Smith, W. Henrietta, all of N.Y.

[73] Assignee: Xerox Corporation, Stamford, Conn.

[21] Appl. No.: 692,108

[22] Filed: Aug. 5, 1996

[51] Int. Cl.⁶ .................................. B23B 31/40; B66C 1/56
[52] U.S. Cl. .................. 279/2.17; 198/803.7; 269/48.1; 279/2.1; 294/93
[58] Field of Search .................... 279/2.01, 2.1–2.12, 279/2.17, 2.22; 269/48.1; 294/93, 94; 198/803.7–803.9, 803.12; 118/500, 503; 242/571, 571.8, 572, 573, 573.1

[56] References Cited

U.S. PATENT DOCUMENTS

| | | | |
|---|---|---|---|
| 2,882,061 | 4/1959 | Johnson | 279/2.12 |
| 5,186,477 | 2/1993 | Nakazawa et al. | 279/2.17 |
| 5,282,888 | 2/1994 | Fukawa et al. | 118/500 |
| 5,320,364 | 6/1994 | Mistrater et al. | 279/2.17 |
| 5,322,300 | 6/1994 | Mistrater et al. | 279/2.17 |
| 5,324,049 | 6/1994 | Mistrater et al. | 279/2.17 |
| 5,328,181 | 7/1994 | Mistrater et al. | 279/2.17 |

*Primary Examiner*—Steven C. Bishop
*Attorney, Agent, or Firm*—Zosan S. Soong

[57] ABSTRACT

There is disclosed a chuck assembly defining a longitudinal axis for internally holding a hollow substrate having an open first end and a second end including: (a) an alignment shoulder positioned along the longitudinal axis; (b) an end portion, positioned along the longitudinal axis, that is adapted to be inserted into the substrate through the open first end and comprised of a polymeric member, wherein the polymeric member has a changeable width including a smaller width to permit insertion of the polymeric member into the substrate and a larger width to contact the polymeric member with the substrate inner surface, and the polymeric member is moveable along the longitudinal axis; and (c) a width changing apparatus operatively coupled to the polymeric member, wherein the polymeric member, which is in contact with the substrate inner surface, pulls the substrate a distance along the longitudinal axis towards the alignment shoulder when the polymeric member moves towards the alignment shoulder.

9 Claims, 2 Drawing Sheets

CHUCK ASSEMBLY HAVING A PULL UP FEATURE

BACKGROUND OF THE INVENTION

This invention relates generally to an apparatus for internally holding a substrate such as a drum or a belt for processing. More specifically, the invention relates to a chuck assembly having a pull up feature to ensure proper seating of the substrate.

For certain processing steps such as dip coating substrates during the fabrication of photosensitive members, it is preferred that the end of the substrate rests against the alignment shoulder of the chuck assembly. This precisely controls the level of coating on the substrate. However, when a plurality of chuck assemblies is employed to simultaneously engage a plurality of substrates, the chances are that some of the substrates will not be properly seated on the chuck assemblies, i.e., the end of the substrate may be spaced from the alignment shoulder. There is a need, which the present invention addresses, for a new chuck assembly which can automatically pull up the substrate towards the alignment shoulder.

The following documents disclose conventional chuck assemblies: Fukawa et al., U.S. Pat. No. 5,282,888; Mistrater et al., U.S. Pat. No. 5,322,300; Mistrater et al., U.S. Pat. No. 5,328,181; Mistrater et al., U.S. Pat. No. 5,320,364; and Mistrater et al., U.S. Pat. No. 5,324,049.

SUMMARY OF THE INVENTION

The present invention is accomplished in embodiments by providing a chuck assembly defining a longitudinal axis for internally holding a hollow substrate having an open first end and a second end including:

(a) an alignment shoulder positioned along the longitudinal axis;

(b) an end portion, positioned along the longitudinal axis, that is adapted to be inserted into the substrate through the open first end and comprised of a polymeric member, wherein the polymeric member has a changeable width including a smaller width to permit insertion of the polymeric member into the substrate and a larger width to contact the polymeric member with the substrate inner surface, and the polymeric member is moveable along the longitudinal axis; and (c) a width changing apparatus operatively coupled to the polymeric member, wherein the polymeric member, which is in contact with the substrate inner surface, pulls the substrate a distance along the longitudinal axis towards the alignment shoulder when the polymeric member moves towards the alignment shoulder.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 1:
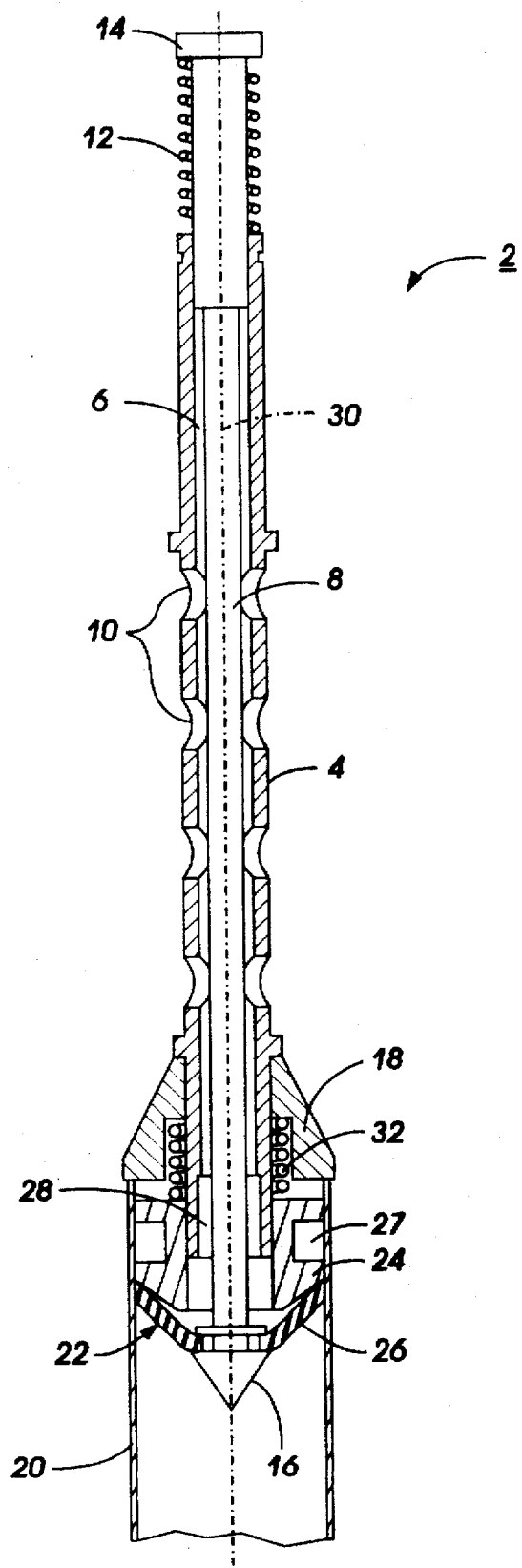
FIG. 1 represents a side cross-sectional view of one embodiment of the present chuck assembly.

FIG. 1 depicts a chuck assembly 2 including a body 4 defining a passageway 6, a width changing apparatus 8 in the form of for example a vertically moveable rod disposed in the passageway along the length of the body. The body may define a plurality of holes 10 to reduce weight. The width changing apparatus 8 is spring loaded via a spring 12 and a top cap 14. A nose piece 16 is coupled to one end of the width changing apparatus. The body 4 includes an alignment shoulder 18 which serves to act as a stop for a substrate 20. The end portion 22 includes a wedge 24 and a polymeric member 26 that has a changeable width. The polymeric member is coupled, via a recess machined into the nosepiece, to the width changing apparatus 8 and rests against the wedge 24. The wedge defines a groove 27 (the purpose of the groove 27 is for mass reduction) and is operatively coupled to a spring 32 which may be a flat spring. A bushing 28 positions the width changing apparatus 8 within the end portion 22. The alignment shoulder 18 and the end portion 22 are positioned on the longitudinal axis 30 of the chuck assembly, where the alignment shoulder is positioned above the end portion.

Operation of the chuck assembly depicted in FIG. 1 proceeds as follows. The width changing apparatus 8 is depressed downwards via pressure on top cap 14, which moves the polymeric member 26 downwards away from the alignment shoulder 18 along the longitudinal axis 30, which stretches the polymeric member downwards, and which may lift a part of the polymeric member slightly off the wedge 24, thereby decreasing the width of the polymeric member. In the present invention, the polymeric member can move along the longitudinal axis; mere stretching of the walls of the polymeric member is not considered movement for the purposes of the present invention. Thus, in embodiments, the entire polymeric member can move down and then up along the longitudinal axis. During the movement of the polymeric member downwards, the spring 32 also pushes the wedge downwards away from the alignment shoulder. When the width of the polymeric member is decreased, the end portion 22 may be inserted into the substrate 20. When the end of the substrate is close to or at the alignment shoulder, the pressure on the end cap is reduced or eliminated and the width changing apparatus 8 moves upward. Upward movement of the width changing apparatus in the direction of the alignment shoulder reduces the downward force on the polymeric member which increases the width of the polymeric member, allows engagement of the edge of the polymeric member with the substrate inner surface, and pulls the substrate towards the alignment shoulder due to the upward movement of the polymeric member and the wedge towards the alignment shoulder. Preferably, the engagement of the polymeric member with the substrate inner surface and the pulling up of the substrate by the upward movement of the engaged polymeric member occur substantially simultaneously. After processing of the substrate, the width changing apparatus is depressed to shrink the width of the polymeric member, thereby allowing withdrawal of the chuck assembly from the substrate.

Thus, in embodiments, the end portion is moveable from an initial position adjacent the alignment shoulder to a position spaced apart from the alignment shoulder and back to like initial position adjacent the alignment shoulder. The polymeric member is adapted to move for a length ranging for example from about 3 mm to about 2 cm along the longitudinal axis. The polymeric member pulls the substrate along the longitudinal axis for a distance ranging for example from about 3 mm to about 2 cm towards the alignment shoulder. Preferably, the pulling action of the polymeric member on the substrate seats the end of the substrate against the alignment 1 shoulder. In preferred embodiments, the chuck assembly can pull up the substrate even when the other end of the substrate is unsupported.

During engagement of the chuck assembly with the substrate, it is preferred that a hermetic seal is created by contact of the polymeric member against the substrate inner surface to minimize or prevent fluid migration, especially liquid, into the interior of the substrate.

Figure 2:
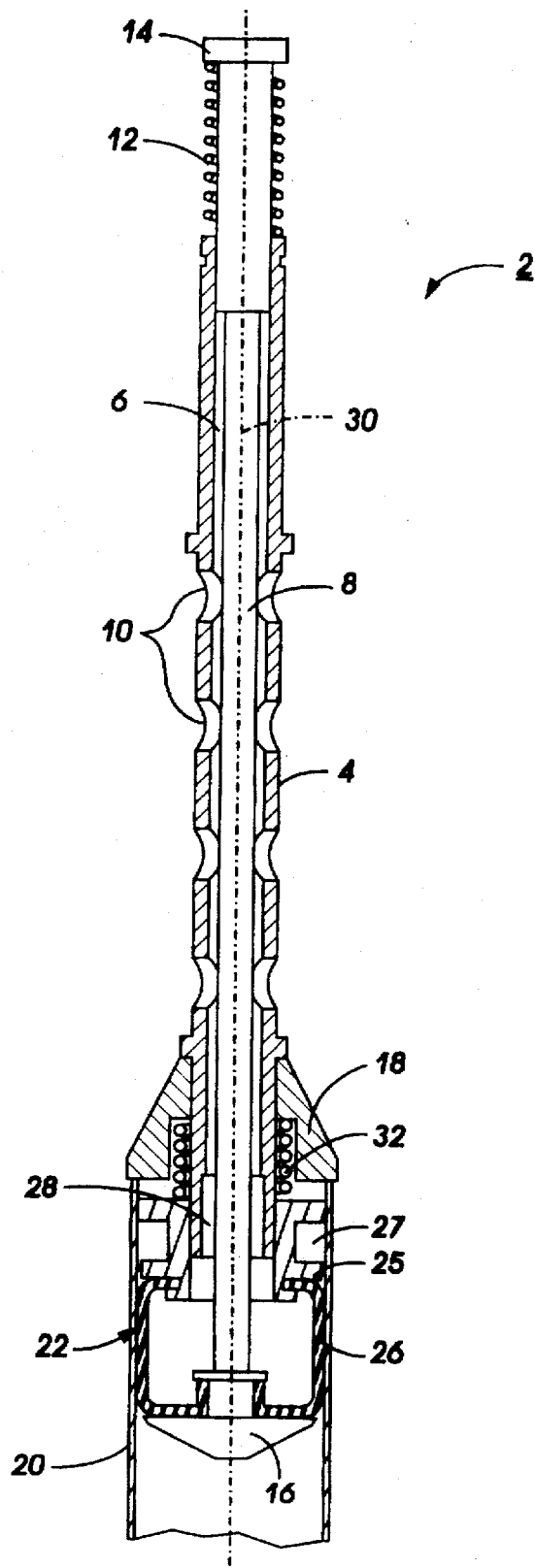
FIG. 2 represents a side cross-sectional view of another embodiment of the present chuck assembly.

The alternative design of the inventive chuck assembly disclosed in FIG. 2 is similar to the chuck assembly of FIG. 1 except the polymeric member 26 has a donut shaped configuration and a compression flange 25 replaces the wedge 24. The compression flange 25 has a recess machined in its lower section to capture the polymeric member 26. Operation of this alternative design of FIG. 2 proceeds in a similar manner to the embodiment of FIG. 1 described herein where the width changing apparatus 8 is depressed downwards via pressure on top cap 14, which moves the polymeric member 26 downwards away from the alignment shoulder 18 along the longitudinal axis 30, which stretches the polymeric member downwards, thereby decreasing the width of the polymeric member. In the present invention, the polymeric member can move along the longitudinal axis; mere stretching of the walls of the polymeric member is not considered movement for the purposes of the present invention. Thus, in embodiments, the entire polymeric member can move down and then up along the longitudinal axis. During the movement of the polymeric member downwards, the spring 32 also pushes the compression flange 25 downwards away from the alignment shoulder. When the width of the polymeric member is decreased, the end portion 22 may be inserted into the substrate 20. When the end of the substrate is close to or at the alignment shoulder, the pressure on the end cap is reduced or eliminated and the width changing apparatus 8 moves upward. Upward movement of the width changing apparatus in the direction of the alignment shoulder pushes the polymeric member against the compression flange which increases the g width of the polymeric member, allows engagement of the edge of the polymeric member with the substrate inner surface, and pulls the substrate towards the alignment shoulder due to the upward movement of the polymeric member and the compression flange towards; the alignment shoulder. Preferably, the engagement of the polymeric member with the substrate inner surface and the pulling up of the substrate by the upward movement of the engaged polymeric member occur substantially simultaneously. After processing of the substrate, the width changing apparatus is depressed to shrink the width of the polymeric member, thereby allowing withdrawal of the chuck assembly from the substrate.

The polymeric member in FIGS. 1–2 may be fabricated from any suitable material including for instance silicone, such as silicone rubber compound no. 88201 available from Garlock Corporation, and flexible/elastic high temperature elastomers such as VITON™ and ZETPOL 2000™ (hydrogenated nitrile elastomer—HNBr). The polymeric member may be coned shaped or donut shaped and may have a wall thickness ranging for example from about 1 mm to about 5 mm. There is a hole in the polymeric member to accommodate the width changing apparatus.

The other components of the chuck assembly may be fabricated from any suitable material. For example, the body and the width changing apparatus may be fabricated from a plastic or a metal like steel or aluminum. Preferably, the wedge and the compression flange are made of a plastic such as TEFLON™.

Any suitable rigid or flexible substrate may be held by the present chuck assembly. The substrate may have a cylindrical cross-sectional shape or a noncylindrical cross-sectional shape such as an oval shape. The substrate may be at least partially hollow, and preferably entirely hollow, with one or both ends being open. In preferred embodiments, the substrate is involved in the fabrication of photoreceptors and may be bare or coated with layers such as photosensitive layers typically found in photoreceptors. The substrate may have any suitable dimensions. An advantage of the chuck assembly in embodiments is that it embodies low mass and therefore may not cause excessive heat flow from a thin substrate to the chuck assembly when placed in an oven.

Other modifications of the present invention may occur to those skilled in the art based upon a reading of the present disclosure and these modifications are intended to be included within the scope of the present invention.

We claim:

1. A chuck assembly defining a longitudinal axis for internally holding a hollow substrate having an open first end and a second end comprising:

(a) an alignment shoulder positioned along the longitudinal axis;

(b) an end portion, positioned along the longitudinal axis, that is adapted to be inserted into the substrate through the open first end and comprised of a polymeric member, wherein the polymeric member has a changeable width including a smaller width to permit insertion of the polymeric member into the substrate and a larger width to contact the polymeric member with the substrate inner surface, and the entire polymeric member is moveable along the longitudinal axis; and (c) a width changing apparatus fastened to the polymeric member, wherein the polymeric member, which is in contact with the substrate inner surface, pulls the substrate a distance along the longitudinal axis towards the alignment shoulder when the polymeric member moves towards the alignment shoulder.

2. The assembly of claim 1, wherein the width changing apparatus comprises a spring loaded rod.

3. The assembly of claim 1, wherein the polymeric member forms a hermetic seal inside the substrate.

4. The assembly of claim 1, wherein the end portion further comprises a wedge in contact with the polymeric member and the assembly further comprises a spring operatively coupled to the wedge.

5. The assembly of claim 1, wherein the end portion is moveable from an initial position adjacent the alignment shoulder to a position spaced apart from the alignment shoulder and back to the initial position adjacent the alignment shoulder.

6. The assembly of claim 1, wherein the polymeric member is adapted to move for a length ranging from about 3 mm to about 2 cm along the longitudinal axis.

7. The assembly of claim 1, wherein the polymeric member pulls the substrate along the longitudinal axis for the distance ranging from about 3 mm to about 2 cm towards the alignment shoulder.

8. The assembly of claim 1, wherein the pulling action of the polymeric member on the substrate seats the first end of the substrate against the alignment shoulder.

9. The assembly of claim 1, wherein the substrate is unsupported at the second end.

* * * * *